Oct. 17, 1939.   S. W. BORDEN   2,176,760
ELECTRODE BRIDGE
Filed April 2, 1938   3 Sheets-Sheet 1

Inventor
Stephen W. Borden

Oct. 17, 1939.   S. W. BORDEN   2,176,760
ELECTRODE BRIDGE
Filed April 2, 1938   3 Sheets-Sheet 3

Inventor
Stephen W. Borden

Patented Oct. 17, 1939

2,176,760

UNITED STATES PATENT OFFICE 2,176,760

ELECTRODE BRIDGE

Stephen W. Borden, Summit, N. J.

Application April 2, 1938, Serial No. 199,633

3 Claims. (Cl. 175—182)

This invention relates to equipment for ascertaining varying geophysical conditions of subterranean portions of the earth crust by measuring differences in the electrical conductivity of the same.

The conditions above referred to may relate to the presence of ore bodies which differ in their ability to conduct electricity from the rocks which surround the same, or to the presence of fractured or broken zones and the thickness and extent of loose or alluvial material, or to the presence of water- and oil-bodies.

The invention is therefore particularly adapted for determining the location of mineral deposits, as an aid in mining, for ascertaining the position of water- or of oil-bearing structures for use in determining structure or stratum and for the location of wells and openings to prospect the same, or for observing the geological conditions of the earth crust as a preliminary to engineering work, such as the construction of dams, the driving of tunnels, etc.

One of the objects of the invention is to provide equipment which, while having the necessary sensitivity, will be free from interference by foreign potentials created by stray earth currents or otherwise. Another object of this invention is to provide equipment suitable for making tests of the equipotential type described by Nichols et al. in United States Patent 1,926,212 and by Mason in United States Patent 1,692,849 and others, and more especially for providing means for conveniently adjusting the resistance of various electrode circuits to a common value for the purposes set forth by Nichols et al. in United States Patent 1,926,212. Another object is to provide means for identifying the instantaneous polarity of a swing current when being used for locating equipotential lines.

There are several types of equipotential lines, several being discussed in the Nichols patent, but for the purposes of defining this invention it is only necessary to deal with the locating of an equipotential line about a single electrode as the equipment defined is equally applicable to locating any type of equipotential line in the earth's surface.

Figure 1:
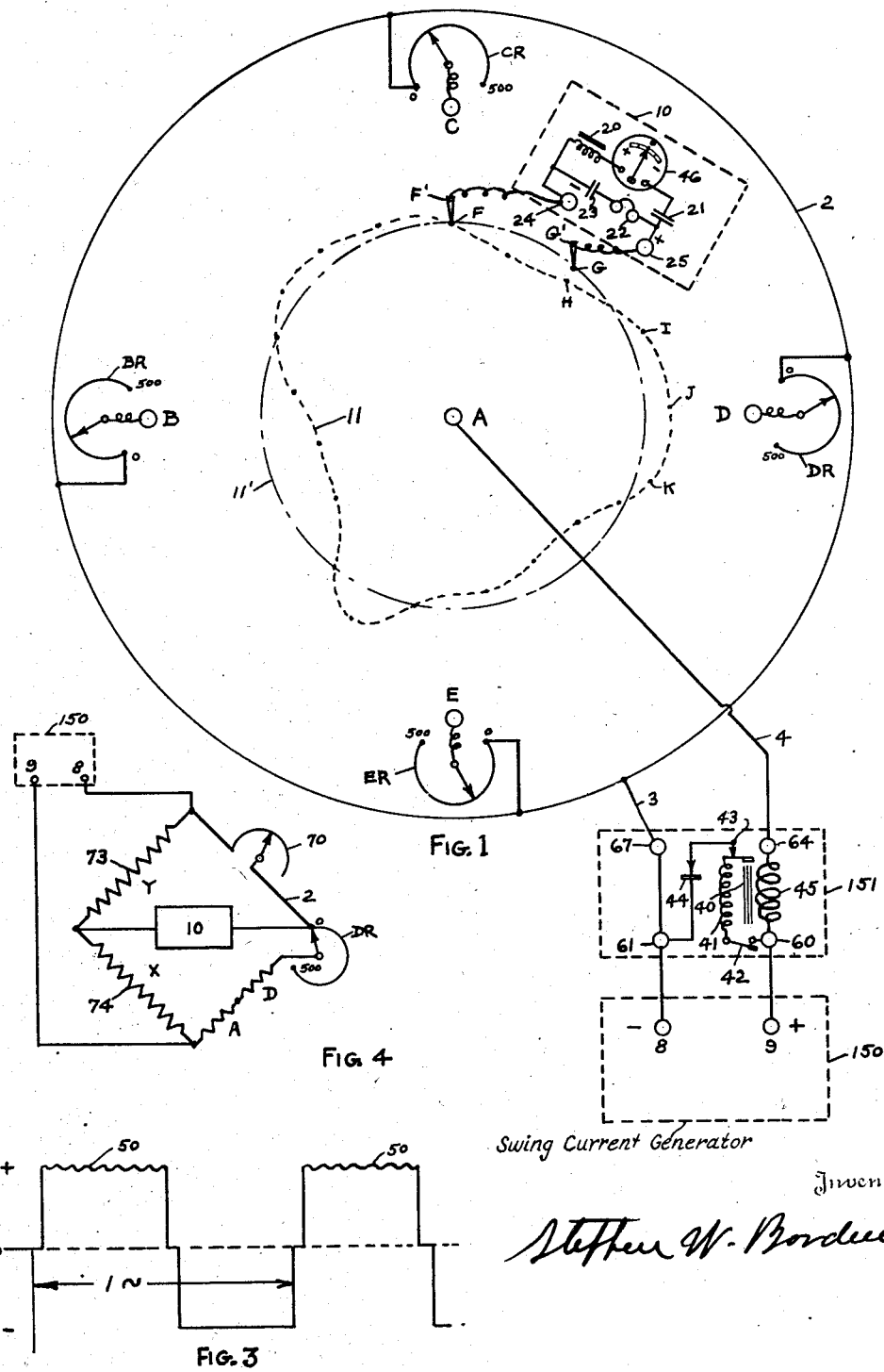
Figure 2:
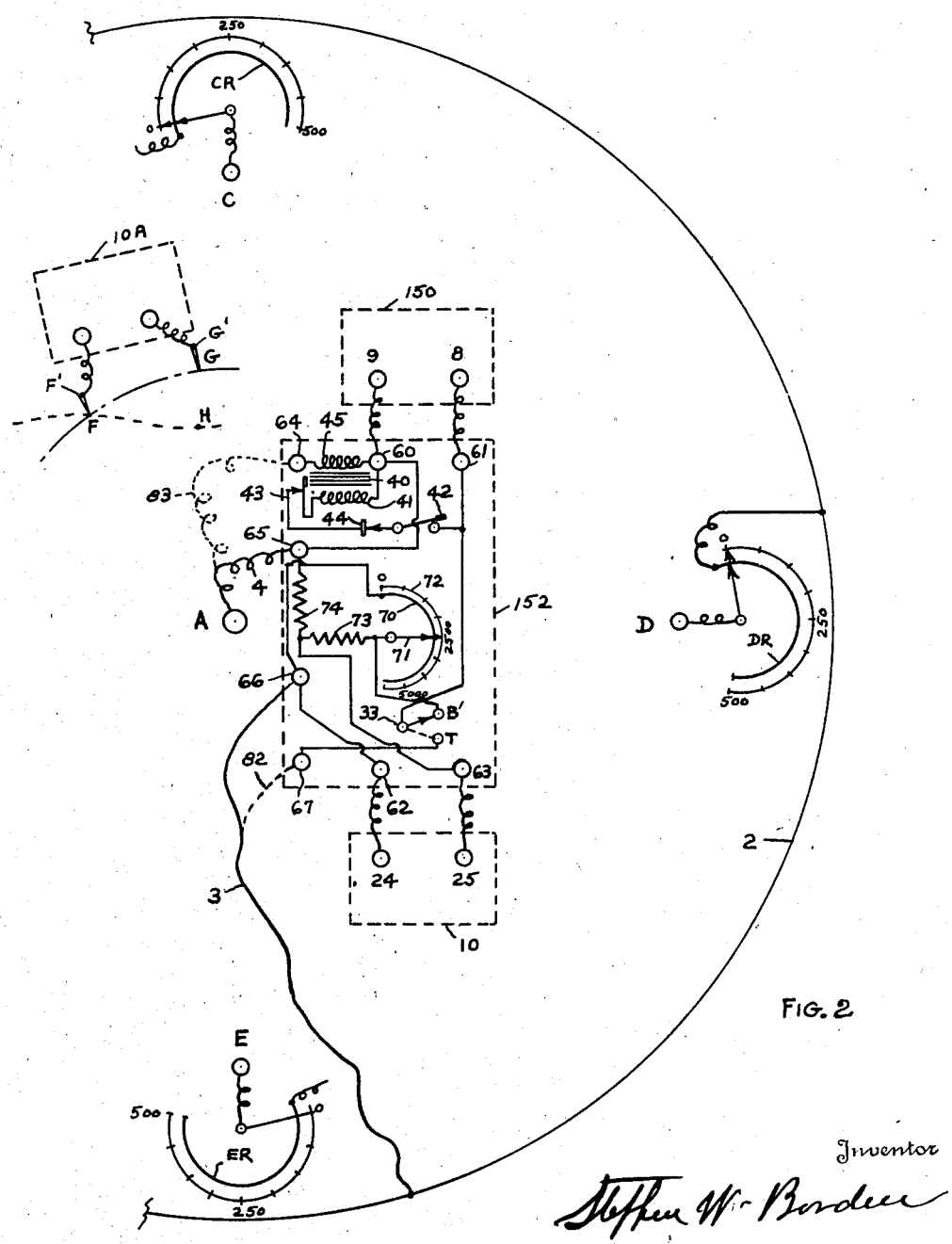
Figure 5:
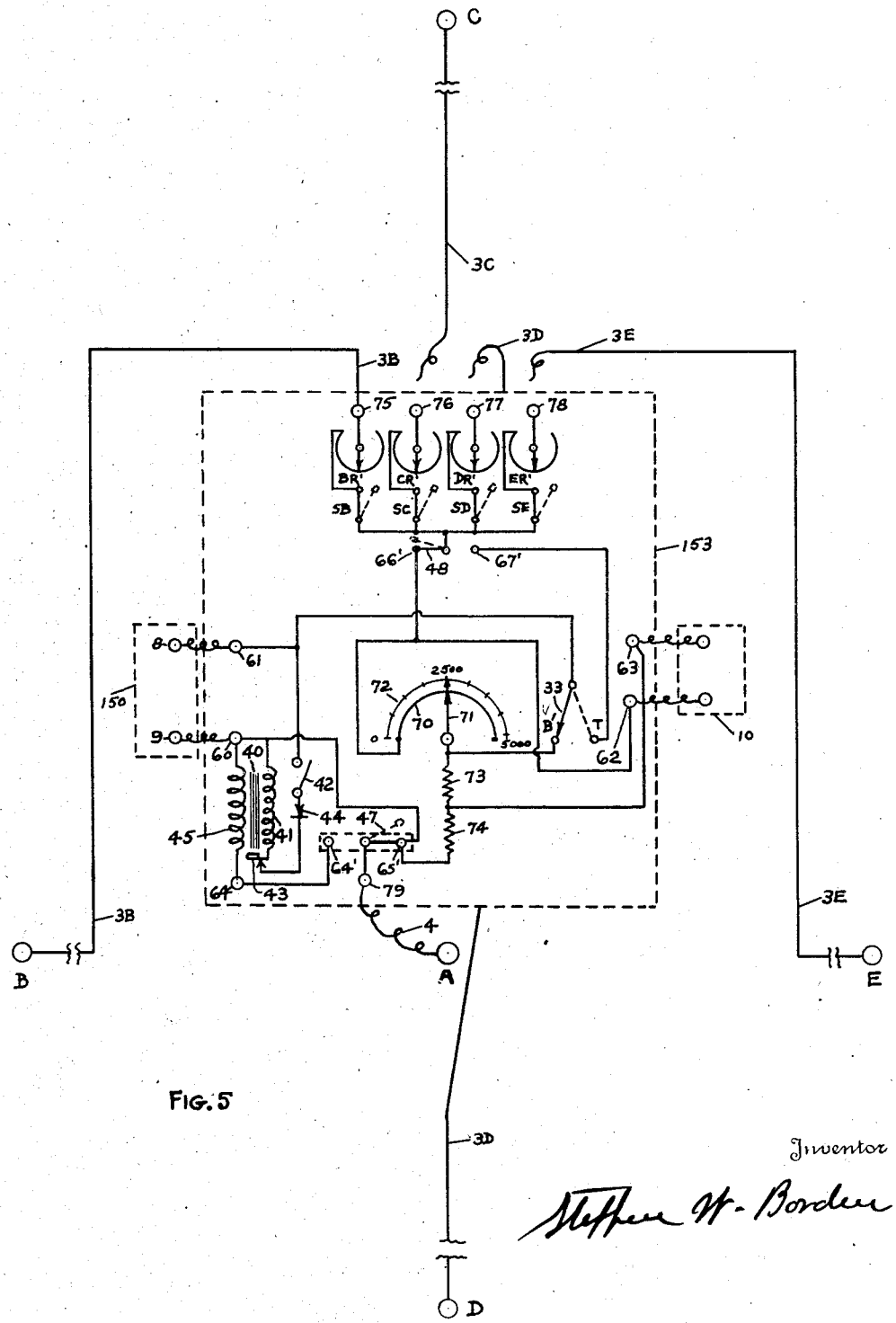

In the drawings, Fig. 1 is a schematic representation of the circuit connections employed for plotting an equipotential line about a single electrode, and Fig. 2 illustrates the different pieces of equipment which I provide for making such a test and the manner in which they are connected up for the purpose. Fig. 3 is a swing current wave, and Fig. 4 shows the circuit connections for measuring the resistance of the electrode circuits. Fig. 5 is an electrode bridge which includes the electrode rheostats.

For carrying out these tests, I employ swing current and a swing current meter. A complete exposition of the nature and use of swing current and swing current meters for testing purposes generally, will be found in my co-pending application, Serial No. 199,625, and types of generators for producing swing current are described in my co-pending applications, Serial Nos. 199,625, 199,626 and 199,630 and in U. S. Patent to Ambron No. 1,897,688.

For use in the specification and claims of this application, the term "swing current" refers to a current flow produced by a potential which varies in a definite manner over a fixed period of time, repetitively, with substantially constant and uniform speed and with a frequency between 1 and 1.5 cycles per second. The wave form of the potential need not conform to any precise pattern, and any of the various patterns illustrated in the drawings, as well as others, will produce the effects desired. A swing current in which the current flows, for a portion of each cycle, above a zero line and, for the balance of the cycle, flows below the zero line, is hereafter referred to as an "alternating swing current" and one in which the current flow, during each complete cycle, is of one polarity only is hereinafter referred to as a "pulsating swing current." Alternating swing currents are illustrated in Figs. 2, 3 and 4, while Fig. 5 illustrates a pulsating swing current. It will be seen that in every case the current flow for at least one-half the cycle is unidirectional and that is an essential feature of "swing current" as herein defined since swing current meters are non-responsive to alternating current.

I have found that the deflections of my swing current meter are substantially in proportion to the average current flow regardless of the wave form of the swing current and it is in this respect differentiated from the conventional vibration type of galvanometer whose deflections closely follow the shape of the wave, meters of this type being sometimes used for waveform analysis.

A "swing current generator" is to be understood to be a device for producing current either directly by generation or indirectly by modification of an existing potential.

In the specification and claims, the term "swing current meter" refers to a meter which has a unidirectional field (usually, but not necessarily, of the permanent magnet type) and a movable coil suspended in the field and arranged to deflect a needle over a center zero scale, the direction of deflection reversing with each change of direction of the current in the coil, the coil construction being such as to avoid all damping effects leaving the moving element free to swing as a substantially true pendulum when the coil circuit is open.

In the specification and claims, the term "swing frequency", as applied to a meter, means that frequency of current supply which will produce a greater deflection of the instrument needle, for any given amount of current flowing through the coil, than will a current of any other frequency.

Referring to the drawings, Fig. 1. A is an earth electrode whose surrounding equipotential lines it is desired to define. B, C, D, and E are energizing electrodes which are to be used in making the test. In series with each of these electrodes B, C, D, and E, I employ an adjustable resistance, as BR, CR, DR, and ER respectively and each electrode is connected via its resistance with a conductor 2 which is connected via a conductor 3 to binding post 8 of swing current generator 150. Terminal 9 of the generator is connected to the electrode A.

The equipment within the dotted enclosure 10 is a swing current meter having two terminals, as 24 and 25, for connection to an exterior circuit, a condenser 21 and choke coil 20 in its potential circuit, and a telephone 22 and a condenser 23 in series, shunted across its terminals. The purpose of the choke coil 20 is to prevent interference by stray alternating current of commercial frequency, and the purpose of condenser 21 is to prevent interference from direct current from any source whatever. Complete details of such a swing meter will be found in my co-pending application, Serial No. 199,625. Device 150 may be any suitable type of swing current generator but for this particular kind of work I would prefer a generator as described in my co-pending application, Serial No. 199,626 and such a generator will produce a wave form as shown in Fig. 3. The swing frequency of the meter is coordinated with the frequency of the swing current generator 150.

Swing current is allowed to flow from the generator to electrode A and thence through the ground to the electrodes B, C, D, and E and thence, via their respective adjustable resistances, back to terminal 8 of the generator. It has been pointed out by Nichols et al. that if only one electrode, as for instance electrode B, is employed, then even if A and B are installed in homogeneous ground, the equipotential lines surrounding A will not be true circles but near circles only and more particularly the electrode A will not be at the average center of even the near circles, which facts considerably complicated the interpretation of the equipotential lines obtained under such circumstances. Theoretically if electrodes be spaced all around the circle 2 and fairly close together then, in homogeneous ground, the equipotential lines about A will be perfect circles and A will be the center of the circles and this condition is approached very closely by using as many as four electrodes equidistantly spaced about A, but this is true only when the resistance of the electrode circuits are substantially the same or, in other words, when the resistance of the circuits is so adjusted that the amount of current flowing through each of the electrodes B, C, D, and E is the same.

When a ground flow has been established between electrode A and the reference electrodes, a difference of potential will exist between any two probes, such as F' and G' when inserted in the earth within circle 2 as at points F and G, unless they are on the same equipotential line. If a null indicator, as 10, be connected to probes G' and F' and the meter shows a deflection, then probe G' is moved one way or the other until no deflection is indicated and if this condition exists when G' has been moved to location H, then F and H are on the same equipotential lines. Meter 10 is then connected to H and another point, as I, is located on the equipotential curve and so on with point J, etc., until the line is completed about the stake A when we will have an equipotential curve as shown by the dotted line 11. If the ground within circle 2 were homogeneous, the equipotential line would conform to circle 11' and the differences in the two lines are indicative of geophysical conditions.

Assuming that it is desired to start an equipotential line at point F, a probe is installed at F and one terminal of meter 10 connected thereto and the other terminal of meter 10 is connected to a probe which is inserted in the ground at any point but preferably a point which will fall as nearly as possible on the equipotential line 11. If the point selected be at G, then there will be a deflection on the meter, and since the distance involved may be very considerable, for instance the distance between G and H might easily be 100 feet or more, it is a distinct advantage if the meter deflection indicates not merely that the points are not on an equipotential line but also whether the probe G' should be moved toward the center stake A or away from it in order to get it on the equipotential line, and this is accomplished as follows:

The device within the dotted enclosure 151 may be termed a "ripple generator" and it consists of an iron core 40 and a winding 41 and a winding 45 and an interrupter 43 operated by core 40 and a single wave rectifier element 44 and a control switch 42. Winding 41 with the rectifier element 44 and interrupter 43 and switch 42 in series (hereinafter termed "energizing circuit") is connected across the terminals 8 and 9 of the swing current generator 150 and the secondary winding 45 (hereinafter termed "series winding") is connected in series with earth electrode A.

We will assume that the swing current generator produces a swing current having a frequency of 1.2 cycles per second and a wave form as shown in Fig. 3. The ripple generator will produce a ripple on the top of each positive half wave as indicated at 50 in Fig. 3. This ripple is produced on the positive half wave, only, because current flows through rectifier 44 only when binding post 9 is positive. The frequency of ripple 50 will correspond to the speed at which the vibrator 43 operates. The pointer of swing meter 10 swings from zero to positive while binding post 9 is positive and from zero to negative while binding post 9 is negative; and if a telephone receiver is connected across the terminals of instrument 10, ripple 50 will be heard in the receiver; and if the ripple is heard when the meter is swinging in the positive direction, it indicates that meter 10 is connected across a potential whose polarity corresponds with the polarity marked on the meter binding posts, and this condition will exist for all positions of electrode G between point A and the equipotential line 11, while the polarity will be reversed for all positions outside line 11. Thus the tester is advised by the tone in the phone whether his electrode G is inside or outside the equipotential line 11 and much unnecessary time and labor is saved which would otherwise be wasted in moving the electrode in the wrong direction.

Referring now to Fig. 2. The device within the dotted enclosure 152 is a self-contained portable device hereinafter referred to as an "electrode bridge." 150 is the swing current generator and 10 the swing current meter, and these three pieces of equipment are assembled together near the center electrode A and connected up as shown. It is to be remembered that the drawings are schematic only and that the distance from A to D may be 1,000 feet or more, and it is to be understood that C and D represent any number of electrodes equally spaced around the circle 2.

The electrode bridge 152 has eight binding posts, 60, 61, 62, 63, 64, 65, 66, and 67. Connected between posts 60 and 64 is the series winding 45 of a ripple generator whose energizing circuit is connected across terminals 60 and 61. 70 is a slide wire resistance having a sliding contact 71 and a calibrated scale 72. The zero end of resistance 70 is connected to terminals 66 and 62. Connected in series between 71 and binding post 65 are two equal fixed resistances 73 and 74, the center point of the resistances being connected to binding post 63. 33 is a single-pole double throw switch having its center contact connected to binding post 61, one outer contact connected to post 67 and the other outer contact connected to sliding contact 71. I prefer to have resistance 70 of about 5,000 ohms and resistances 73 and 74 of about 1,000 ohms each.

In setting up the equipment for test, the devices 10, 150, and 152 are assembled near the center electrode A. The generator 150 is connected to terminals 60 and 61, the meter 10 is connected to terminals 62 and 63, and electrode A is connected to terminal 65 by conductor 4, and binding post 66 is connected by a conductor 3 to conductor 2 which latter conductor connects together all of the reference electrodes B, C, D, and E.

The testing procedure is as follows. One only of the reference electrodes, as D, is connected to conductor 2, as in Fig. 2. Switch 33 is thrown to the left to connect post 61 with contact 71, which results in the circuit connections shown in Fig. 4. This is seen to be a simple Wheatstone bridge of which fixed resistances 73 and 74 constitute two adjacent arms, resistance 70 the third arm, and the earth electrodes A and D in series constitute the fourth arm (DR must be set at zero). Resistance 70 is now adjusted until the bridge is in balance, and the resistance value necessary to produce the balance is noted. Electrode D is now disconnected from 2 and the other electrodes E, B, and C are connected in turn to conductor 2 and the resistance necessary to balance the bridge in each case noted or, in other words, the resistance of electrode A, in series with each of the four current return electrodes, has been measured and noted and it is now possible to adjust the resistances BR, CR, DR, and ER so that the current flow through each of the electrodes B, C, D, and E will be equal. As each electrode resistance is adjusted, the electrode is connected to conductor 2.

The current return electrode resistances having been all set at their proper values, switch 33 is thrown to the right connecting terminal 61 with 67. Conductor 3 is disconnected from terminal 66 and connected to terminal 67 as shown by dotted line 82, and conductor 4 is disconnected from terminal 65 and connected to terminal 64 as shown by dotted line 83, thus connecting terminal 9 of the swing current generator to electrode A with the ripple generator winding 45 in series, and terminal 8 to conductor 2. Meter 10 is disconnected from terminals 62 and 63 and connected to the probes F' and G' and the equipotential line determined in the manner previously described.

Referring now to Fig. 5, 153 represents an electrode bridge which includes all of the electrode bridge 152 and also additional elements. The elements BR', CR', DR', and ER' are the electrode resistances shown in the other figures as adjacent to the electrodes, and binding posts 75, 76, 77, and 78 are for connection to the electrodes B, C, D, and E. SB, SC, SD, and SE are single pole switches for connecting each of the electrodes to either terminal 66' or 67' by means of the single pole double throw switch 48, which terminals now take the place of binding posts 66 and 67 of device 152.

In using device 153, the posts 75, 76, 77, and 78 are connected to respective electrodes B, C, D, and E, switch 48 is thrown to terminal 66', switch 47 is thrown to 65', and, switch SB being closed and rheostat BR' being at zero, a resistance measurement is made as previously described. The same procedure is now gone through with electrodes C, D, and E, after which the resistances BR', CR', DR', and ER' are adjusted to their proper values, switches SB, SC, SD, and SE are closed, and switch 48 is thrown to terminal 67', switch 33 to terminal T and switch 47 to terminal 64' when the equipment is ready for plotting equipotential lines with the ripple generator in circuit.

The "electrode bridge" 153 is obviously the preferable type of equipment as it is desirable to have the electrode rheostats concentrated near the central point and to have them properly housed. Individual leads from a central point to each electrode require a smaller total length of wire than is required for a ring type conductor as 2 and this has been used in the drawings for the sake of simplicity only.

It will be understood that the ripple generator 151 is not an essential feature of devices 152 and 153 as it may be a separate device, as in Fig. 1, or it may be a part of the swing current generator 150 or it may be dispensed with entirely.

Switch 47 is a convenience but non-essential since the ripple generator may not be used and if used may be put in circuit by changing the lead 4 from post 79 to 64. Switches SB, SC, SD, and SE are also a convenience but non-essential since the electrodes B, C, D, and E may be connected, selectively and collectively, to their respective binding posts. For the purposes of the claims, switch 47 is considered permanently closed on contact 65' and switches SB, SC, SD, and SE permanently closed.

Switches 33 and 48 (and also 47 when employed) may be combined in a single two or three pole, two position switch.

It will be observed that the same meter is used as the null detector for both the bridge 152 and for use with the test probes F' and G' and that the same source of current is used for the bridge and for furnishing the earth energizing current, and it should also be noted that the leads 3 and 4, which are necessary for the equipotential line test regardless of what type of equipment is used for making the test, are utilized when adjusting the resistance values of the various current return electrodes and that no additional test leads are required nor is it necessary to move any of the equipment from the one location near the center stake, which features are important because of the distance involved.

While I have described certain features more or less in detail, it will be understood that the invention will employ various devices of differing forms and construction and it is to be understood that the invention is not to be limited except by the scope of the appended claims taken in conjunction with the state of the prior art.

What I claim is:

1. Equipment for making geological surveys which includes a swing current generator connected to two energizing earth electrodes spaced apart in the earth and a swing current meter connected to two earth probes, spaced apart and inserted in the earth, for detecting a difference of potential between the earth probes caused by the flow of current between the energizing electrodes the swing frequency of the null indicator being coordinated with the swing frequency of the current generator.

2. Equipment for making geological surveys which includes a swing current generator connected to two energizing earth electrodes spaced apart in the earth and a swing current meter connected to two earth probes, spaced apart and inserted in the earth, for detecting a difference of potential between the earth probes caused by the flow of current between the energizing electrodes, the swing frequency of the null indicator being coordinated with the swing frequency of the current generator and a ripple generator which includes a transformer having one winding connected in series with the swing current generator and a second winding connected between the output terminals of the swing current generator via an interrupter arranged to be actuated by the flux generated in the transformer core by the second winding.

3. The method of making a geological survey which includes causing a swing current to flow through a portion of the earth to energize the same, connecting a swing current meter to two potential probes and inserting the probes in the earth, the probes being spaced apart and so spacing the probes with respect to each other that no swing current passes through the swing current meter thus establishing an equipotential line between the two points and thereafter relocating one of said probes to establish an additional point on the equipotential line and repeating this operation until the equipotential line closes upon itself forming a more or less distorted circle about one of the energizing electrodes.

STEPHEN W. BORDEN.